United States Patent
Milnes et al.

(10) Patent No.: US 7,864,057 B2
(45) Date of Patent: Jan. 4, 2011

(54) PET LOCATING DEVICE

(75) Inventors: Stanford D. Milnes, McKinney, TX (US); Demitrius Nelon, Watauga, TX (US); George W. Mills, Sachse, TX (US); Harold E. Asbridge, Rowlett, TX (US); John M. LaTronico, Dallas, TX (US); Keni D. LaTronico, legal representative, Dallas, TX (US)

(73) Assignee: Perfectech, Inc., Plano, TX (US)

( * ) Notice: Subject to any disclaimer, the term of this patent is extended or adjusted under 35 U.S.C. 154(b) by 295 days.

(21) Appl. No.: 11/714,316

(22) Filed: Mar. 6, 2007

(65) Prior Publication Data

US 2008/0061990 A1  Mar. 13, 2008

Related U.S. Application Data

(60) Provisional application No. 60/844,089, filed on Sep. 13, 2006.

(51) Int. Cl.
G08B 13/14 (2006.01)

(52) U.S. Cl. ............ 340/573.1; 340/573.4; 340/539.21; 340/989; 340/825.49; 119/721; 119/859; 119/908; 455/100; 455/507; 342/457; 342/386

(58) Field of Classification Search ............ 340/573.3, 340/573.4, 989, 825.49, 573.1, 539.21; 119/721, 119/859, 908; 455/100, 507; 342/357.07, 342/457, 386

See application file for complete search history.

(56) References Cited

U.S. PATENT DOCUMENTS

| | | | |
|---|---|---|---|
| 5,771,002 A * | 6/1998 | Creek et al. ............ 340/539.21 |
| 5,850,196 A | 12/1998 | Mowers | |
| 6,067,018 A * | 5/2000 | Skelton et al. ........... 340/573.3 |
| 6,172,640 B1 | 1/2001 | Durst et al. | |
| 6,236,358 B1 | 5/2001 | Durst et al. | |
| 6,421,001 B1 | 7/2002 | Durst et al. | |
| 6,441,778 B1 | 8/2002 | Durst et al. | |
| 6,480,147 B2 | 11/2002 | Durst et al. | |
| 6,515,619 B1 * | 2/2003 | McKay, Jr. ............. 342/357.07 |
| 6,518,919 B1 | 2/2003 | Durst et al. | |
| 6,693,585 B1 * | 2/2004 | MacLeod ............... 342/357.07 |
| 6,720,879 B2 | 4/2004 | Edwards | |
| 6,771,213 B2 | 8/2004 | Durst et al. | |
| 6,859,171 B2 | 2/2005 | Durst et al. | |
| 6,923,146 B2 | 8/2005 | Kobitz et al. | |
| 7,113,126 B2 | 9/2006 | Durst et al. | |
| 2004/0162875 A1 * | 8/2004 | Brown ........................ 709/203 |
| 2005/0073409 A1 | 4/2005 | Durst et al. | |
| 2005/0186968 A1 | 8/2005 | Durst et al. | |
| 2006/0202818 A1 | 9/2006 | Greenberg | |

* cited by examiner

*Primary Examiner*—Tai T Nguyen
(74) *Attorney, Agent, or Firm*—Klemchuk Kubasta LLP; Darin M. Klemchuk

(57) ABSTRACT

A pet location system having a pet locator with GPS capabilities in communication with a wireless network such that a user interface accessible on a common computer network or by telephone is provided. The pet location system includes access to the user interface via a computer on the common computer network or via a telecommunications network.

7 Claims, 5 Drawing Sheets

PET LOCATING DEVICE

This application claims priority and the benefit under 35 U.S.C. §119(e) from United States Provisional Patent Application Ser. No. 60/844,089 entitled "Apparatus for Providing Physical Location of Domestic Animals" filed Sep. 13, 2006, which is hereby incorporated by reference as if fully disclosed herein.

BACKGROUND

1. Field of the Invention

The present invention relates generally systems for locating pets that are lost and in particular to GPS enabled pet locating system.

2. Description of Related Art

Within the pet industry, and in particular within the pet locator market, there have been many attempts to use technology to assist owners who have lost their pets. Some have used radiofrequency while others have used GPS locators in complex systems.

Such systems have failed to provide a product or service that is acceptable to the marketplace in simplicity, usability and features.

A need exists, therefore, for a pet location system that includes a pet locator with GPS capabilities in communication with a wireless network such that a user interface is accessible on a common computer network or by telephone.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The problems presented in pet location are solved by the systems and methods of the present invention. In accordance with one embodiment of the present invention, a pet location system that includes a pet locator with GPS capabilities in communication with a wireless network such that a user interface accessible on a common computer network or by telephone is provided. Such a system would preferably include a database accessed by the user interface with user data associated with locator data to assist the user in managing an account as well as querying the pet locator for location or diagnostic information.

Additional features would include the ability to phone into the user interface via a standard telephone number to query the pet locator with automated commands or by phoning into an operator who would query the pet locator via the user interface and give location information verbally. Further additional features would include the ability of third parties to access location information from the user interface to provide additional services, such as display of location information on portable display devices, such as phones and handheld computers, or integration of location information into other services provided to the user by third parties.

Other objects, features, and advantages of the present invention will become apparent with reference to the drawings and detailed description that follow.

DETAILED DESCRIPTION OF THE PREFERRED EMBODIMENT

All references cited herein are incorporated by reference to the maximum extent allowable by law. To the extent a reference may not be fully incorporated herein, it is incorporated by reference for background purposes and indicative of the knowledge of one of ordinary skill in the art.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
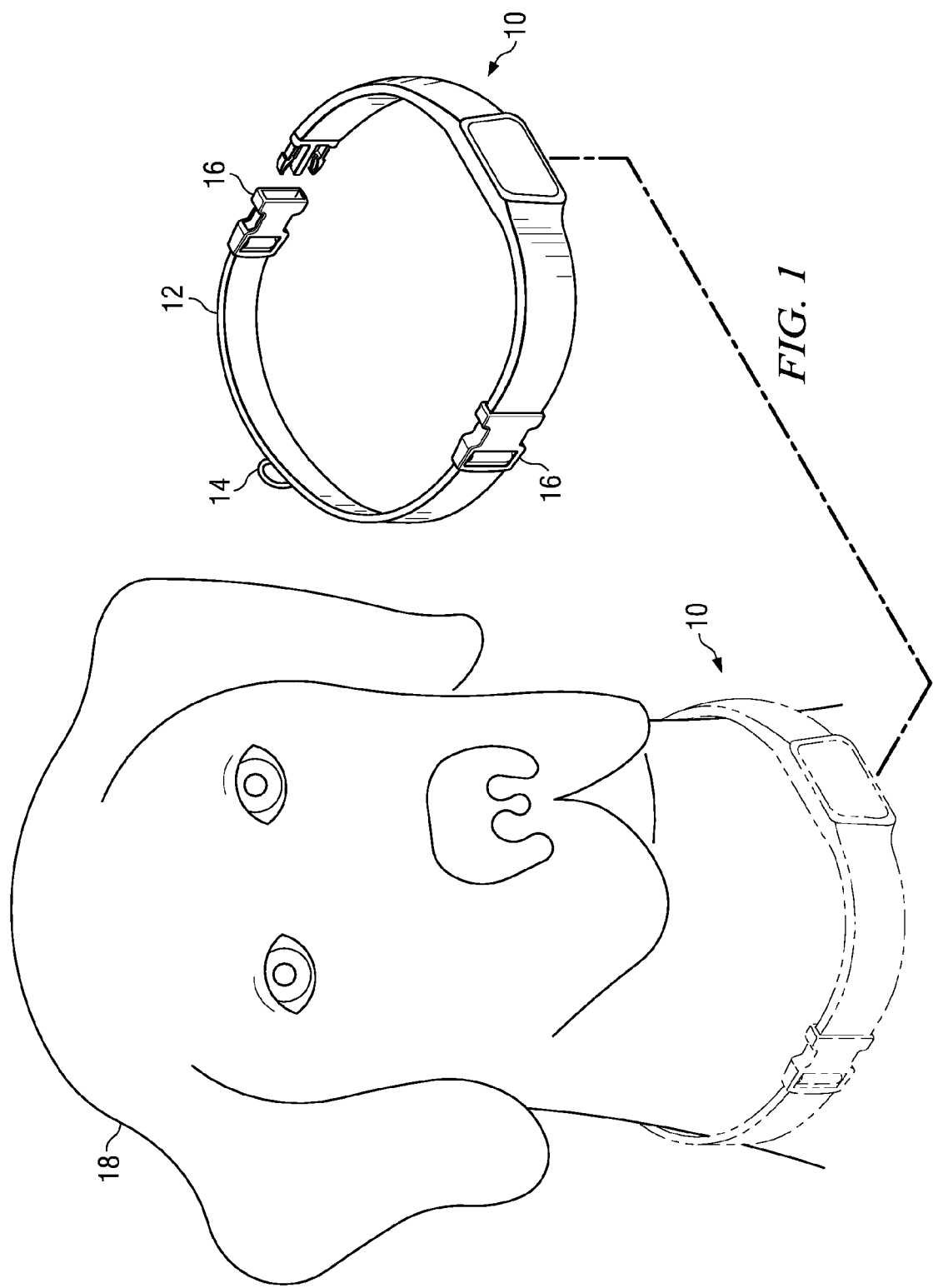
FIG. 1 is a pet locator shown on and off of a canine pet.

FIG. 1 is a pet locator 10 shown on and off of a canine pet 18. The pet locator 10 is attached to a collar 12 having a leash ring 14 and clips 16. Using clips 16 to connect collar 12 to pet locator 10 forms a loop that may be secured around the neck of a canine pet 18. Collar 12 may be sized to fit a wide variety of canine and feline pets 18 with a single pet locator 10. Pet locator 10 may be attached to other types of pets 18 as well and the term pet 18 is not limited to family companions, but may include a variety of animals.

Figure 2:
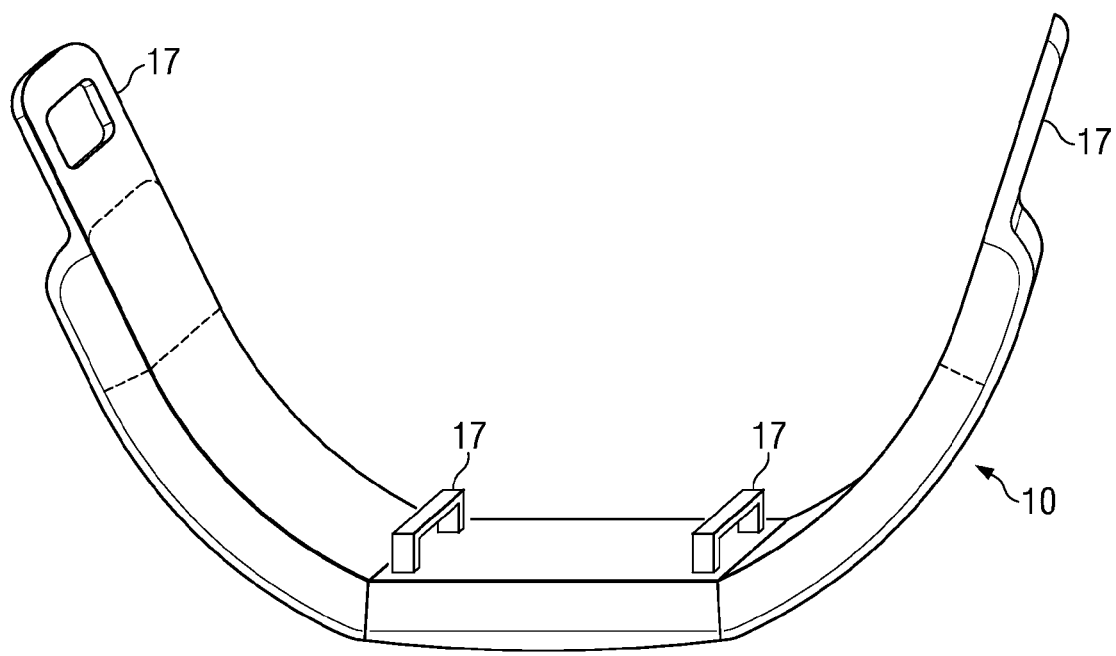
FIG. 2 is another pet locator.

FIG. 2 is another embodiment of a pet locator 10 adapted to fit an existing collar 12 by feeding collar 12 through loops 17. Loops 17 allow pet locator 10 to be attached to a wide variety of collars 12 to fit the preferences of the pet 18 and pet owner.

Figure 3:
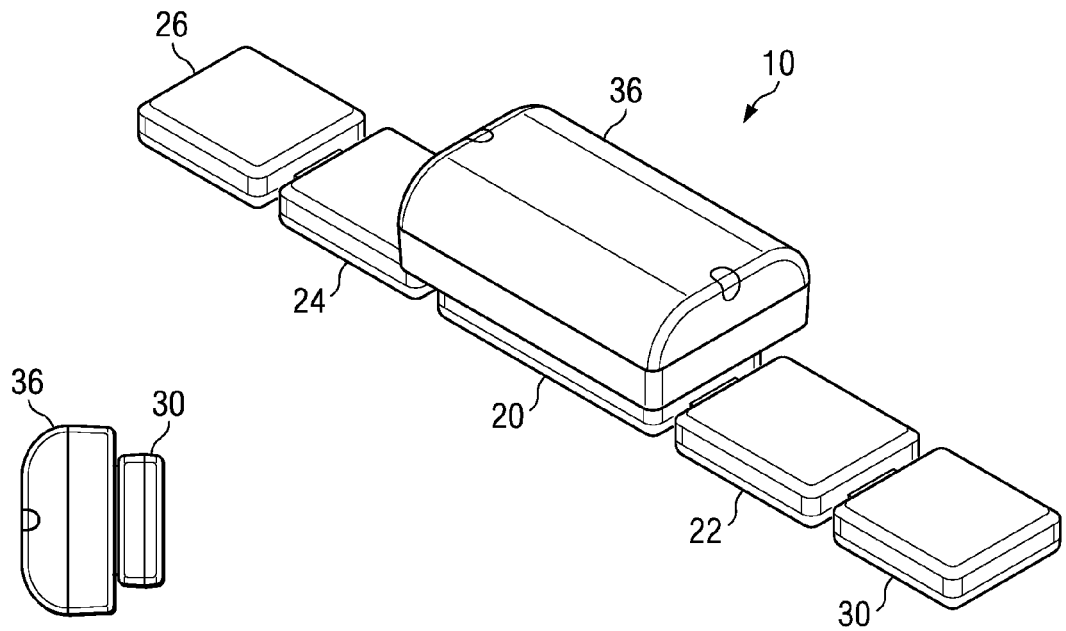
FIG. 3 is a pet locator and battery pack.
Figure 3:
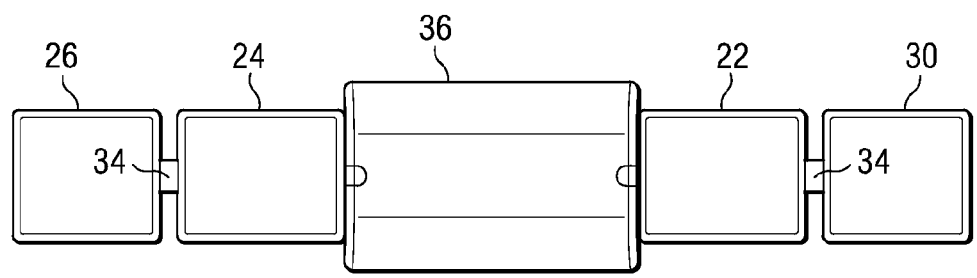
Figure 3:
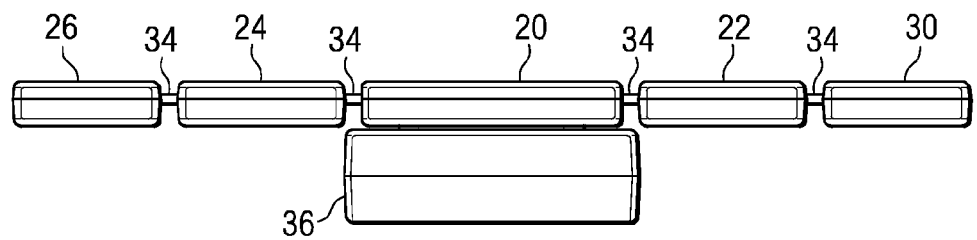
Figure 3:
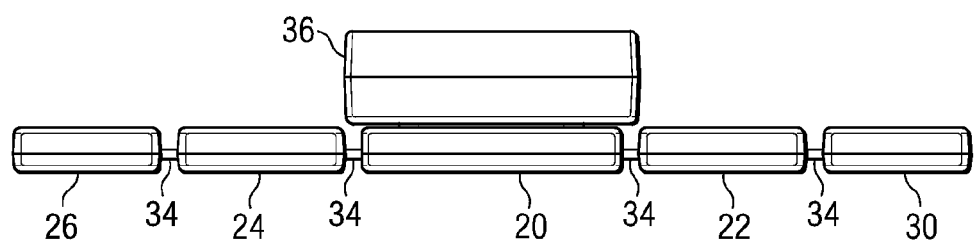

FIG. 3 is a pet locator 10 showing the various functional parts thereof in several views, including a logic module 20 in connection with a wireless module 22 and a GPS module 24. GPS module 24 is further in communication with a GPS antenna 26 such that the GPS module 24 and GPS antenna 26 receive signals from a global positioning satellite system 28 to calculate the location of GPS antenna 26 using algorithms and processes commonly known in the GPS arts. Wireless module 22 is in communication with a wireless antenna 30 such that wireless module 22 and wireless antenna 30 receive and transmit signals on a wireless network 32. Wireless network 32 is preferably the NPCS/PCS two-way pager network or mobile phone network as those networks are currently understood in their respective fields. It is understood that new wireless networks 32 may eventually provide coverage similar or superior to these known networks and be useful for this application. Wireless module 22 is a transceiver appropriate to the chosen wireless network 32.

Logic module 20 is connected to wireless module 22 and GPS module 24 by flexible electronic connections 34 so that pet locator 10 may flex to fit a variety of pets 18. Wireless module 22 is connected to wireless antenna 30 and GPS module 24 is connected to GPS antenna 26 by flexible electronic connections 34, as well. Battery pack 36 is shown connected to logic module 20 and supplies electrical power to pet locator 10.

Figure 4:
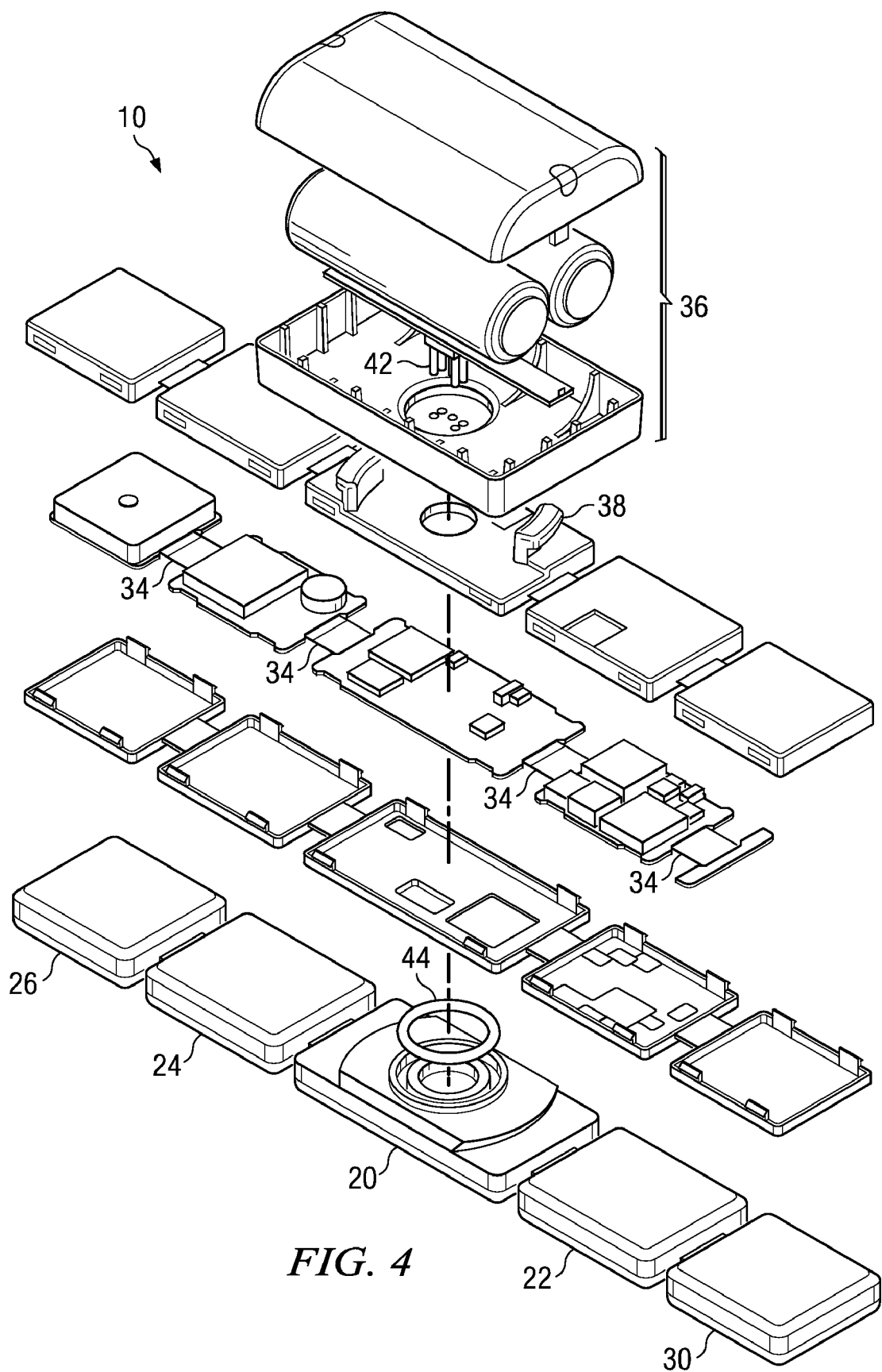
FIG. 4 is an exploded view of the pet locator of FIG. 3.

FIG. 4 is a pet locator 10 and battery pack 36, shown in exploded view. Battery pack 36 has grooves 40 for mating into tabs 38 on logic module 20, and electrical connector 42 for engagement with logic module 20. Seal 44, preferably an o-ring, is placed between logic module 20 and battery pack 36 and around electrical connector 42 to prevent fluids from entering logic module 20 or fouling electrical connector 42. Battery pack 36 may be a rechargeable battery pack or a disposable battery pack. Removal of battery pack 36 from the pet locator 18 allows for easy replacement or temporary removal for recharging without removing pet locator 10 from pet 18.

Figure 5:
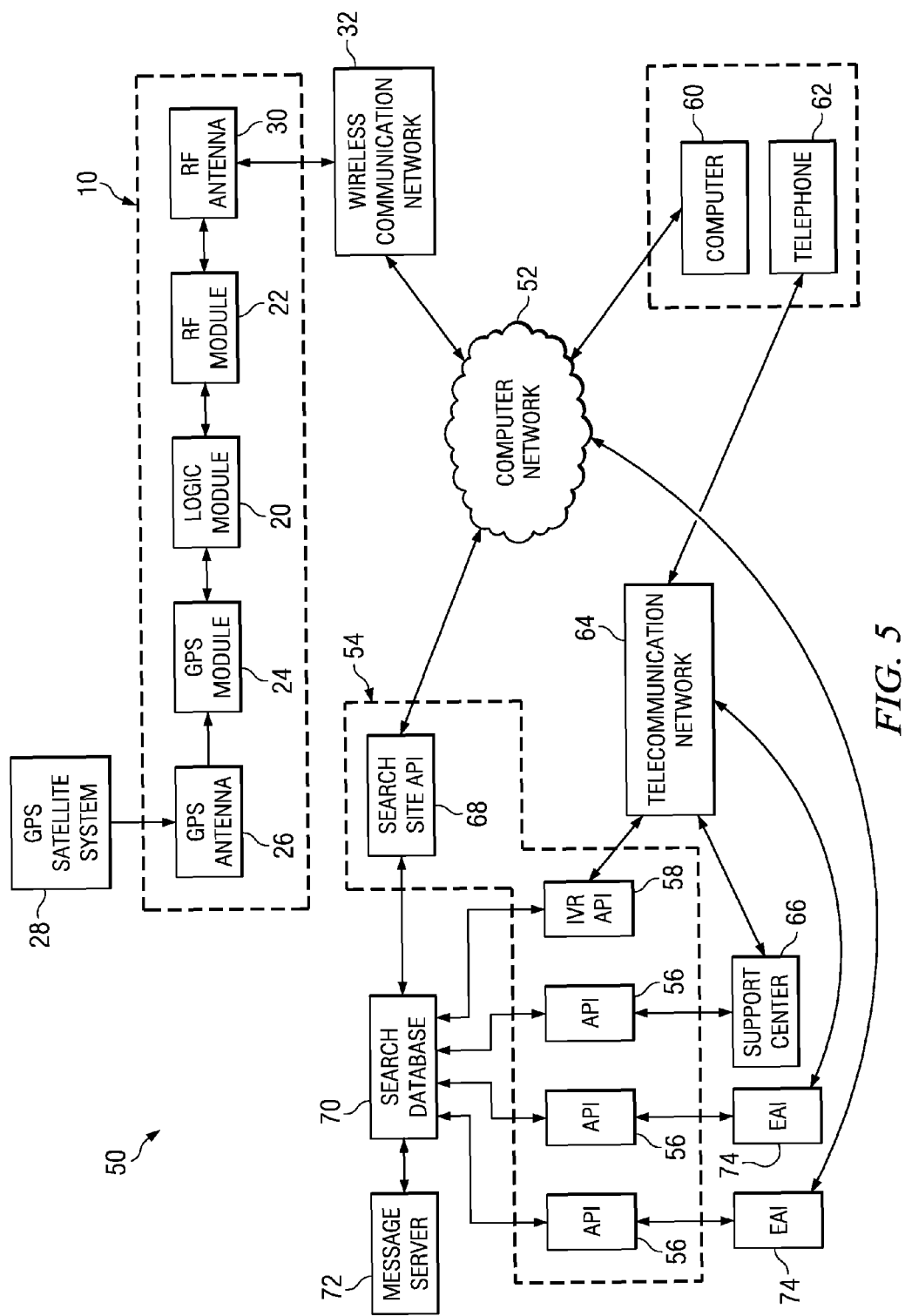
FIG. 5 is a schematic of a pet location system using a pet locator.

FIG. 5 is a schematic of a pet location system 50 having the basic structure of a pet locator 10, wireless network 28, computer network 52, and a user interface 54. Pet locator 10 is shown receiving signals from the GPS system 28 to and in two-way communication with the wireless network 32. Wireless network 32 is in two-way communication with a computer network 52. The user interface is made up of application programming interfaces (API) 56, such as search site 68 and interactive voice recognition (IVR) system 58, in communication with a search database 70 and a message server 72. The user interface 54 is accessible by a user by either a personal computer 60 or by telephone 62. The personal computer 60 communicates with the user interface 54 through search site 58 via a computer network 52 to initiate queries to the pet locator 10 and view responses from the pet locator 10. Additionally, an end user may use a telephone 62 to call over a telecommunications network 64 to an IVR API 58 or a support center 66. Support center 66 is preferably at least one operator with computer access to the search database 70 and message server 72 through an API 66. Support center 66 can receive a verbal request from an end user and initiate a query to the pet locator 10 and verbally communicate location information to the user once returned from the pet locator 10. IVR API 58 allows for similar service in an automated fashion well known to users of interactive voice recognition.

The user interface 54 is intended to provide a variety of functions and query options. Interface 54 would require login and verification of the user to prevent unauthorized access. Interface 54 would allow an authorized user to initiate a query to the pet locator 10 requesting a wide variety of information such as any of the following information: location, battery power level, self diagnostics report, GPS signal reception, wireless signal reception, continuous tracking. Query functions may be added or deleted based on service contract or need. A location query would instruct logic module 20 to activate GPS module 24 and receive GPS signals from the GPS system 28 at the GPS antenna 26. The location information would then be transmitted back to the message server 72 to be accessed via the user interface 54 or the support center 66. The location information would be translated into a format selected by the user, such as street address or graphical representation. A continuous location query would instruct the logic module to repeat this process, providing location information at a pre-selected interval until the logic control is instructed to quit transmitting. System information queries, such as battery power level, signal strengths and self diagnostics, would instruct the logic module 20 to perform the requested tasks and report the requested information back to the message database 72. The small size of the battery is assisted by the fact that much of the pet locator 10 is not powered until a query is received. Only the wireless module needs power on a consistent basis, and even that can be reduced by operating at a pre-selected interval instead of continuously.

User interface 54 allows for the multiple pet locators 10 to be associated with a single user and provides other customer service and sales functions, such as answering common questions about the system, advertising service plans, and accepting credit card payment.

External application interfaces 74 allow for third party access to the search database 70 and message server 72 via the telecommunications network 64 or computer network 52. External application interfaces 74 may be used by third parties such as cellular phone service providers or GPS service providers to add the pet locator 10 location information into enriched programs, such as an enriched graphical representation incorporating data from other sources as well. By providing API 56 that allow access for external application interfaces 74 it is expected that third parties will develop niche products using pet locator 10 information for potential clients.

The primary advantage of the present invention is the flexibility of the application bridge and the user interface to handle a wide variety of tasks and data and provide for future uses by third parties. While the utility has been described most clearly in the context of locating pets, a similar system may be easily modified for the location of people and other animate objects. For example, pet locator 10 may be modified to fit a belt of a child and pet location system 50 may be modified to be used by parents, guardians, or police to locate a child reported missing.

It should be apparent from the foregoing that an invention having significant advantages has been provided. While the invention is shown in only a few of its forms, it is not just limited but is susceptible to various changes and modifications without departing from the spirit thereof.

We claim:

1. A method of locating a pet, the method comprising:
   sending a status query from a user interface via a wireless network to a pet locator circuit located remotely from the user interface;
   receiving a response to the status query in the user interface via a wireless network;
   processing the response to the status query at a logic module associated with the user interface to determine a battery power level of the remote pet locator circuit;
   determining location information associated with the pet locator circuit via satellite signals; and
   displaying the location information and the battery power level using the user interface.

2. The method according to claim 1 further comprising:
   initiating the status query via a telephone connection associated with the user interface.

3. The method according to claim 1 further comprising:
   initiating the status query via a telephone operator in response to a vocal request for the status query.

4. The method according to claim 1 further comprising the step:
   associating user data and pet locator data in a database accessible by the user interface.

5. The method according to claim 1 further comprising the step:
   transmitting the location information from the user interface to a display device.

6. The method according to claim 5 further comprising the step of:
   displaying the location information in a graphical manner on the display device.

7. The method according to claim 1 further comprising the step of:
   transmitting the location information from the user interface to third parties.

* * * * *